United States Patent
Bates et al.

(10) Patent No.: US 9,510,008 B2
(45) Date of Patent: Nov. 29, 2016

(54) VIDEO DECODER MEMORY BANDWIDTH COMPRESSION

(71) Applicant: Entropic Communications, Inc., San Diego, CA (US)

(72) Inventors: Matthew Damian Bates, Austin, TX (US); Mark Alan Baur, San Diego, CA (US)

(73) Assignee: ENTROPIC COMMUNICATIONS, LLC, Carlsbad, CA (US)

( * ) Notice: Subject to any disclaimer, the term of this patent is extended or adjusted under 35 U.S.C. 154(b) by 485 days.

(21) Appl. No.: 14/175,774

(22) Filed: Feb. 7, 2014

(65) Prior Publication Data

US 2015/0146785 A1    May 28, 2015

Related U.S. Application Data

(60) Provisional application No. 61/908,539, filed on Nov. 25, 2013.

(51) Int. Cl.
| H04N 19/42 | (2014.01) |
| H04N 19/426 | (2014.01) |
| H04N 19/423 | (2014.01) |
| H04N 19/46 | (2014.01) |
| H04N 19/48 | (2014.01) |
| H04N 19/91 | (2014.01) |

(52) U.S. Cl.
CPC .......... *H04N 19/428* (2014.11); *H04N 19/423* (2014.11); *H04N 19/426* (2014.11); *H04N 19/46* (2014.11); *H04N 19/48* (2014.11); *H04N 19/91* (2014.11)

(58) Field of Classification Search
CPC .. H04N 19/423; H04N 19/426; H04N 19/46; H04N 19/48
See application file for complete search history.

(56) References Cited

U.S. PATENT DOCUMENTS

| 5,016,102 | A | * | 5/1991 | Avis | G06T 7/202 |
| | | | | | 348/452 |
| 7,006,698 | B2 | * | 2/2006 | Adiletta | H04N 19/159 |
| | | | | | 375/240.02 |
| 2006/0291567 | A1 | * | 12/2006 | Filippini | H04N 19/61 |
| | | | | | 375/240.24 |
| 2010/0074328 | A1 | * | 3/2010 | Zuo | H04N 19/172 |
| | | | | | 375/240.03 |

* cited by examiner

*Primary Examiner* — Robert Hance
(74) *Attorney, Agent, or Firm* — McAndrews, Held & Malloy Ltd.

(57) ABSTRACT

A method, system and computer program for decompressing video data, storing the compressed video data in such a way that random access is possible and the data can be mapped efficiently into existing memory systems and interface protocols. The compression is accomplished via lossless compression using an algorithm optimized for video data. Due to the compressed format, data transmission consumes less bandwidth than using uncompressed data and prevents degradation in the decoded video.

15 Claims, 21 Drawing Sheets

| e  | f  | e  |
|----|----|----|
| 40 | 42 | 40 |
| g  | h  | g  |
| 44 | 46 | 44 |
| e  | f  | e  |
| 40 | 42 | 40 |

FIG. 10

VIDEO DECODER MEMORY BANDWIDTH COMPRESSION

RELATED APPLICATIONS

The present application claims priority to U.S. Provisional Application No. 61/908,853, filed Nov. 25, 2013, assigned to Assignee hereof, the specification of which is incorporated herein by reference.

TECHNICAL FIELD

The disclosed methods, computer programs, and systems relate to communication systems, and more particularly to optimizing bandwidth in accessing external memory components when used in a video processing and display system.

BACKGROUND

A common implementation of a system is to have specialized components which are built in a cost effective manner that are combined together to form a system that performs a set of functions. In most video processing systems such as a set-top box, there is a main processing unit, such as system on chip, and external memory devices, in addition to various interface and support devices. The external memory is often used to store temporary data required by the system in order to achieve the function. In the case of a video processing system, external memory is often used to hold video images before they are displayed.

A common problem with the implementation of the system is that the interface between the main processing unit, the system on chip, and the external memory has a limited bandwidth. In general, the smaller the number of pins an interface requires, the cheaper it is to manufacture. Technology and speed also play a large part in the performance, but often these are limited by the memory technologies available in volume quantities, such as dynamic random-access memory devices.

SUMMARY

The following presents a simplified summary of one or more embodiments in order to provide a basic understanding of some aspects of such embodiments. This summary is not an extensive overview of the one or more embodiments, and is not intended to identify key or critical elements of the embodiments or delineate the scope of such embodiments. Its sole purpose is to present some concepts of the described embodiments in a simplified form as a prelude to the more detailed description that is presented later.

The claimed embodiments are targeted to improve the amount of effective bandwidth that can be realized through the system on chip to memory interface by compressing the data so that it takes less bandwidth to transmit the same amount of information.

Typical strategies to solve the problem of limited bandwidth are to increase the width of the interface, allowing for more data to be transferred in parallel, or to run the interface at a higher effective speed. The number of pins is typically increased in discrete blocks of pins to allow for easier management and addressing of the data transferred between the memory device and the system on chip control system. Each additional pin will add to the system cost of the implementation.

The speed of operation of the interface is most often dictated by the design of the memory interface device and the protocol implemented on the interface. The state of the art technology will generally set the speed of the interfaces to a maximum value for a certain technology and protocol. To make a device cost effective to manufacture and produce, there is a limited number of supported protocols. Standardizing the protocol allows for many systems to use the same memory device for many different functions, increasing the volume of manufacturing and reducing the cost for the memory devices.

Increased performance can be achieved with specialized protocols and memory devices, but these are generally higher in overall costs due to lower overall volume and less manufacturing scaling.

Another common solution used to save bandwidth is to compress the data to be stored. Raw data is compressed into a smaller data set, transferred across the interface, stored in the memory devices and later retrieved for use. Because the data set is smaller due to compression, less bandwidth is needed on the interface to transfer the information.

Compression technologies fall into two categories, lossless and lossy compression. Lossy compression will result in a loss of information after decompression, while the lossless will not lose any information when the data is compressed and decompressed. The tradeoff between the two modes is that lossy compression can generally be controlled to give a predictable amount of compression, and therefore, can be applied easily into a system that allocates a certain bandwidth and memory storage for the compressed data. Lossy data compression is used extensively in video display and processing systems to reduce the amount of system bandwidth needed to transmit video images.

However, within a video processing system itself, a lossless memory system is generally needed to correctly perform the video processing functions. Lossless memory storage is needed in many video processing systems because the system will rely on exact data from previous and future images to generate a current picture. One major problem with using lossless data compression within a video processing system is that it is not possible to predict the amount of compression that can be realized. The amount of compression realized will depend on the data itself. This severely complicates the process of making random access into the compressed data to retrieve a portion of the data to be used for processing. To make a random access often requires the decompression of a larger amount of data, increasing the local storage requirements greatly and increasing the latency to a level where the data cannot be retrieved in time to be displayed.

Video systems generally require access to small two dimensional blocks of video data that is stored in external memory. Memory systems are organized in two dimensions as well, and this maps well to storing and accessing uncompressed video data. The dimensions and access patterns can be optimized to allow for efficient access using the common protocols. However, when variable sized compressed data is stored, the access alignment to this data cannot be made efficiently and the effective bandwidth on the interface is severely reduced.

The claimed embodiments address these problems by compressing the data with an algorithm optimized for video data, and storing the compressed data in such a way that random access is possible and data can be mapped efficiently onto the existing memory system and interface protocols. Since the data is stored in a compressed format, it will consume less bandwidth to transfer the same amount of data, allowing for more data to be transmitted in the same amount of time as before, increasing the overall bandwidth. This is a novel approach, as it allows for compression with more deterministic access and addressability.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

FIG. 8 shows an example of the predicted surface after the second order stage is an arbitrary two-dimensional slope.

FIG. 10 shows the re-calculation the 3rd order stage of the four 2×2 sub-blocks.

Figure 1:
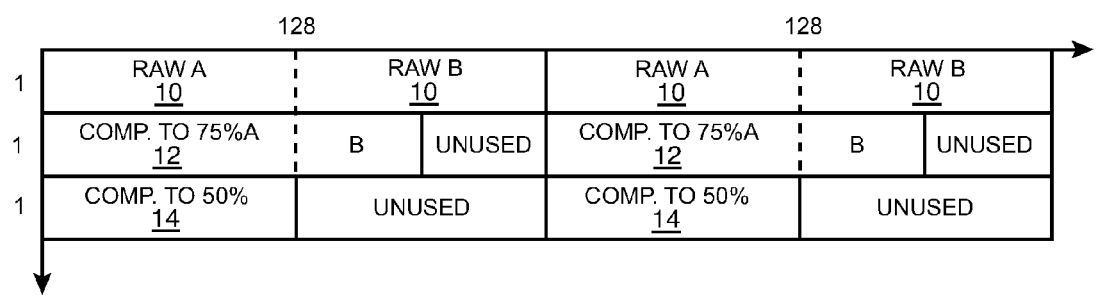
FIG. 1 illustrates three (3) cases of uncompressed chunks in different percentages.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

The embodiments claimed herein use the inherently limited frequency spectrum in video data to losslessly compress the data in order to reduce the memory bandwidth. By mapping predefined surfaces to the image, and then encoding the differences the compression, can approach 50%. However, for difficult images, compression may not be achieved, and therefore the embodiments discussed in this disclosure are useful in applications where bandwidth reduction is advantageous, as opposed to strictly necessary.

The savings in the bandwidth required is reduced to a range between 60% and 70% of normal. This is particularly important to achieve decode and display of 4K ultra high definition television at an acceptable cost.

This disclosure assumes lossless compression is required so that there is no degradation in the decoded video due to error propagation through inter-coded or intra-coded pictures. Lossless compression also retains the ability for automated decoded picture verification such as picture cyclic redundancy check calculations.

The purpose of the claimed embodiments is to reduce the bandwidth of the memory accesses required to decode and display the video and not to reduce the storage requirements. This results in reducing the cost of the system by avoiding a wider bus between the system on chip and the double data rate memory devices or dynamic random-access memory devices. A wider bus requires more input/output pins on the system on chip, a larger system on chip package, more physical memory devices, and more board space and therefore more cost. Moreover it is assumed that there is a cost penalty associated with increasing the number of double data rate memory devices but proportionally reducing each devices capacity. This is because the cost of devices does not scale linearly with their capacity.

The embodiments disclosed do not reduce the storage requirements. In fact, it slightly increases the storage in order to store some sideband information about each block A severe problem with other types of memory compression is that variable compression rates cause the addressing scheme to become very complicated. This can make random access into the decoded video next to impossible, which may not be a problem for just storage and display where all the pixels are addressed in a simple linear sequence, but will make such schemes unusable to a video decoder where random access is required for motion compensation.

In the claimed embodiments, the compressed memory chunks are collocated with their uncompressed equivalents. This makes the addressing scheme virtually unchanged and therefore simple to implement. If the chunk is successfully compressed then it replaces the first half of the uncompressed chunk and the second half is unused. If the chunk cannot be compressed, then it is simply stored, uncompressed.

A refinement to the embodiments adds a second level of compression where chunks that can be compressed to 75% are also handled. If a chunk does not fit within 50%, then it is tested to see if it fits within 75%. A further possible refinement is to allow yet another level of compression, e.g. 87.5%, although the efficiency gains are diminishing.

FIG. 1 shows the three (3) cases of uncompressed chunks 10, chunks compressed to 75% 12 and chunks compressed to 50% 14 (compression to 87.5% is not shown). In all cases, a read operation will fetch the first half of the chunk (denoted as RAW A) and only fetch RAW B if it is present. Each chunk in this example is 128×1 bytes, as indicated in FIG. 1.

Memory addressing is not significantly impacted because compressed chunks are stored in the first half of where the uncompressed chunks would be. A "chunk" is defined as a unit of compression.

Chunks will be addressed in fixed units that represent two dimensional arrays of pixels on the display, for example 32×4 or 64×4 arrays of pixels. The algorithm requires that the dimensions of the arrays are multiples of 4 pixels. Increasing the width improves both the memory efficiency and the compression efficiency, but excessive width will reduce the caching efficiency for random access (since it becomes more likely that time is wasted fetching unwanted pixels). Increasing the height would have all the same effects as increasing the width, but with an additional penalty of significantly increasing the cost of the line buffers required for scanline access for display. Therefore, the optimal configuration is a wide rectangle and for the rest of this disclosure, the size will be assumed to be 32×4, although this disclosure is intended to cover other sizes.

Figure 2:
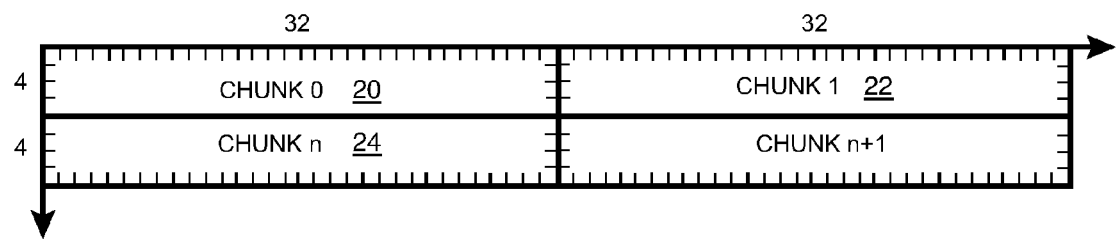
FIG. 2 illustrates how chunks are stored sequentially in memory.

Chunks are stored sequentially in memory starting from the chunk representing the top left pixels of the display and then progressing left to right and then down. This is shown in FIG. 2 where n is the number of horizontal chunks needed to store the picture and chunk 0 20 is the 32×4 array of pixels at (0, 0) to (3, 31), chunk 1 22 is the 32×4 array of pixels at (0, 32) to (3, 63), chunk n 24 is the 32×4 array of pixels at (4, 0) to (7, 31), etc. Each pixel component is either, 8, 10 or 12 bits.

Figure 3:
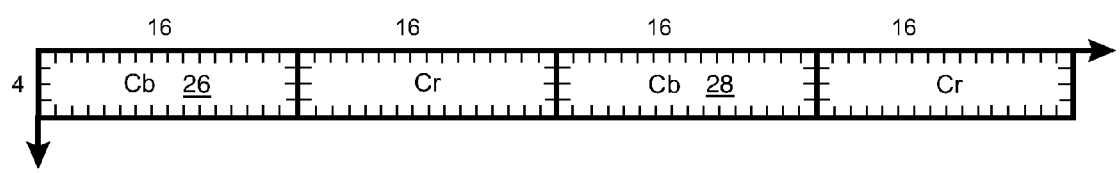
FIG. 3 shows an example of two consecutive chroma chunks.

For luma data a 32×4 array will represent a horizontal series of eight 4×4 blocks. For interleaved chroma data a 32×4 array will represent two independent horizontal series each of four 4×4 blocks. In this embodiment it is assumed that a typical subsampled chroma is used in the Moving Picture Experts Group (MPEG) video compression. This is where each chroma component, Cr 28 and Cb 26, is subsampled by a factor of two in both the x and y dimensions. It is also assumed that the two chroma components are interleaved so that a horizontal line of luma (Y) data occupies the same storage space as a horizontal line of interleaved chroma (CbCr) data, although there is half the number of chroma lines compared to luma lines. However, the claimed embodiments apply equally to other chroma formats, in particular the non-subsampled case where there are simply three component planes, one for each of Y, Cb, and Cr, the embodiment simply applies identically to each plane with no special handling for chroma. An example of two consecutive chroma chunks is in FIG. 3, where Cb 26 represents the blue-difference color component and Cr 28 represents the red-difference color component.

The algorithm does not inherently handle interlaced video which requires a modified algorithm or a modified storage scheme (separate field buffers). If interlaced video is transmitted without the use of interlaced tools, i.e. as a sequence of field pictures, and decoded into field picture buffers, then no change to the algorithm or storage scheme is required. Obviously, the display pipeline must be able to handle interlaced video from separate field buffers.

Figure 4:
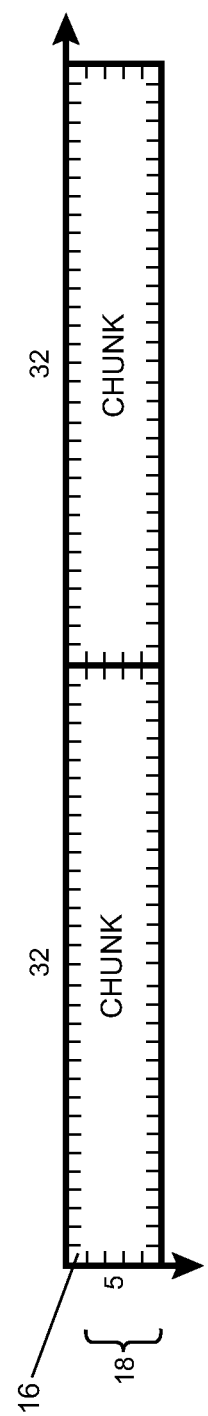
FIG. 4 shows an example of a 10 bit video requires a new video buffer format structure.
Figure 5:
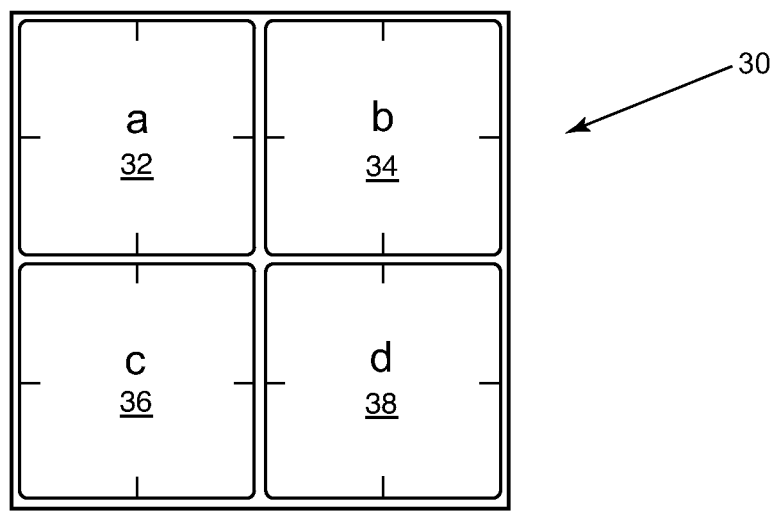
FIG. 5 shows a 4×4 block subdivided into four 2×2 sub-blocks.

A 10 bit video requires a new video buffer format regardless, but for efficiency, the proposed new structure is similar to the following example, as depicted in FIG. 4. The first row of bytes 16 holds the low order 2-bits/pixel packed together, the remaining 4 rows 18 hold the same 32×4 (or 64×4) 8-bit pixels as before. Each byte in first row 16 hold the low order 2 bits of the 4 pixels immediately below it as shown below:

| row | bit |
|---|---|
| 0 | 1:0 Line 0 pixel[1:0] |
|  | 3:2 Line 1 pixel[1:0] |
|  | 5:4 Line 2 pixel[1:0] |
|  | 7:6 Line 3 pixel[1:0] |
| 1 | 7:0 Line 0 pixel[9:2] |
| 2 | 7:0 Line 1 pixel[9:2] |
| 3 | 7:0 Line 2 pixel[9:2] |
| 4 | 7:0 Line 3 pixel[9:2] |

The following describes an algorithm that has been shown to compress on average over 75% of chunks in a typical high definition image. A chunk to be compressed consists of multiple 4×4 blocks.

The algorithm uses a form of transformation to the frequency domain by attempting to fit the blocks to a set of surfaces. Each candidate surface represents one or more fundamental spacial frequencies and phases. Only two frequencies are considered in each dimension; $\frac{1}{8}^{th}$ and $\frac{1}{4}^{th}$ of the pixel frequency. The theoretically highest frequency of $\frac{1}{2}$ is ignored because, either it is unlikely to present in high definition and ultra-high definition images, or if it is present, it is unlikely that it can be losslessly compressed by a sufficient ratio.

First the mean (M) of all of the pixels is calculated and the $0^{th}$ order error terms are calculated. The combined size of the header and the variable length code encoding all of the error terms is then stored for the $0^{th}$ order case. If this stage is used as the final result, the stored bits are T, M, {error terms}, where T is the 2 or 3 bit coding type. In this case T indicates $0^{th}$ order coding.

The algorithm then continues to the first order stage; 4×4 block 30 is subdivided into four 2×2 sub-blocks a 32, b 34, c 36 & d 38, as shown in FIG. 4 and the mean pixel value for each of these is calculated using:

$$M = \frac{1}{16}\sum_{y=0}^{3}\sum_{x=0}^{3}P_{yx}$$

$$a = \frac{1}{4}\sum_{y=0}^{1}\sum_{x=0}^{1}P_{yx}, b = \frac{1}{4}\sum_{y=0}^{1}\sum_{x=2}^{3}P_{yx}, c = \frac{1}{4}\sum_{y=2}^{3}\sum_{x=0}^{1}P_{yx},$$

$$S_a = \text{sign}(M-a), S_b = \text{sign}(M-b), S_c = \text{sign}(M-c),$$

$$d = \frac{1}{4}\sum_{y=2}^{3}\sum_{x=2}^{3}P_{yx}$$

$$S_a = \text{sign}(M-d),$$

The delta between each sub-block and M is calculated and a 2×2 sign map {$S_a$, $S_b$, $S_c$, $S_d$} is generated. There are 16 possible sign maps which can be divided into 4 classes ("unidirectional slope", "corner impulse", "diagonal", and "impossible").

Figure 6:
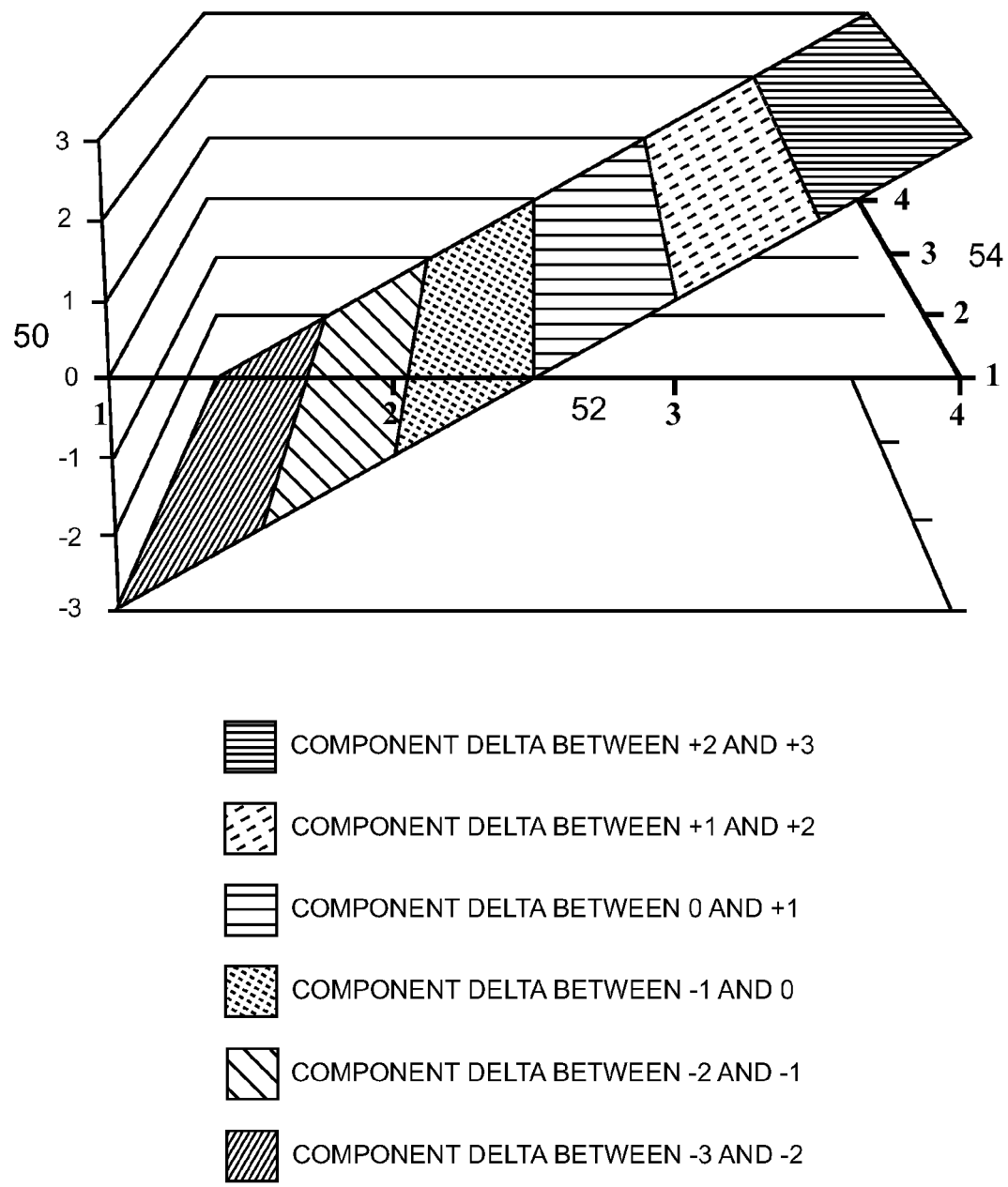
FIG. 6 shows a unidirectional slope embodiment example.
Figure 7:
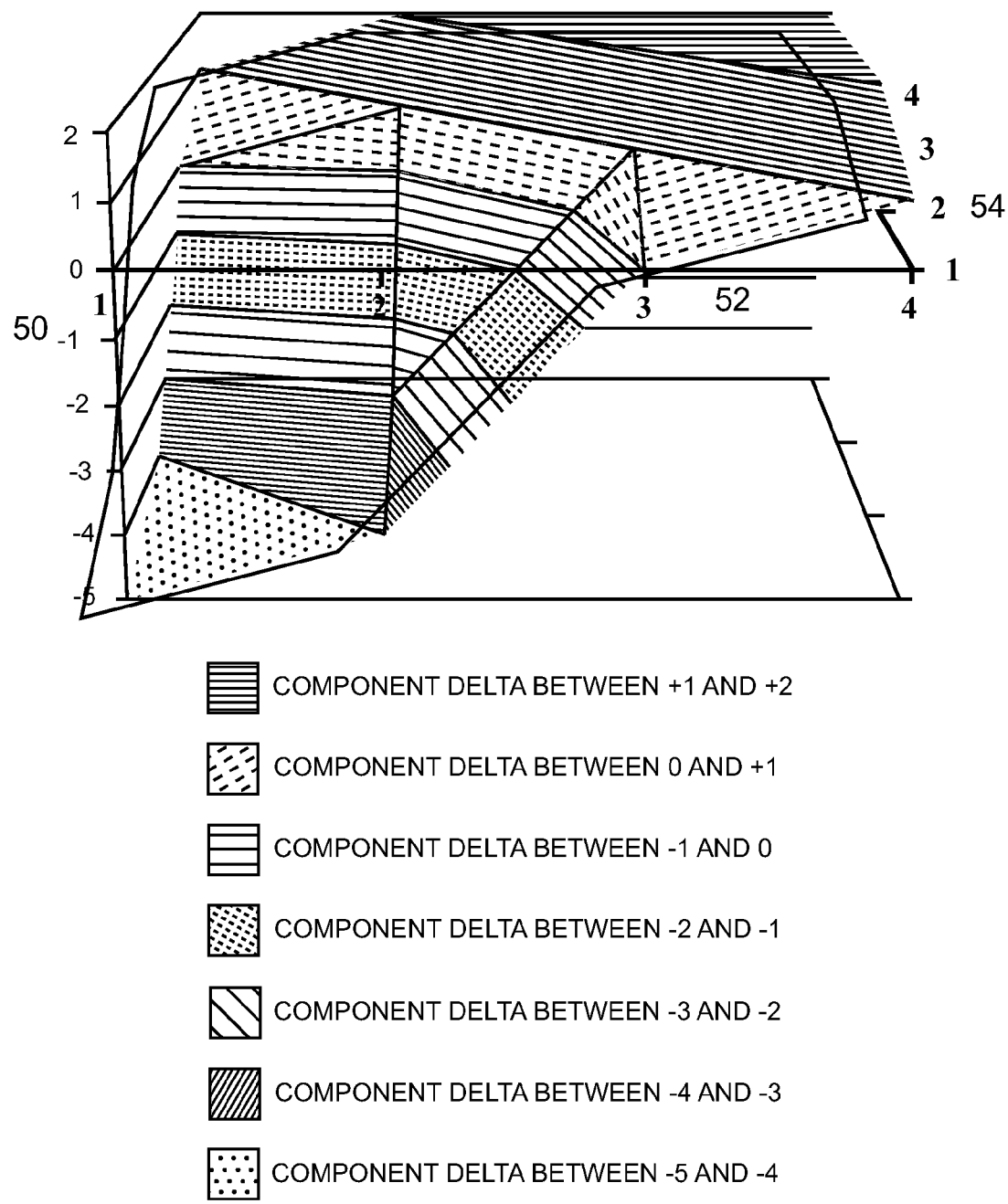
FIG. 7 shows a corner impulse embodiment example.
Figure 8:
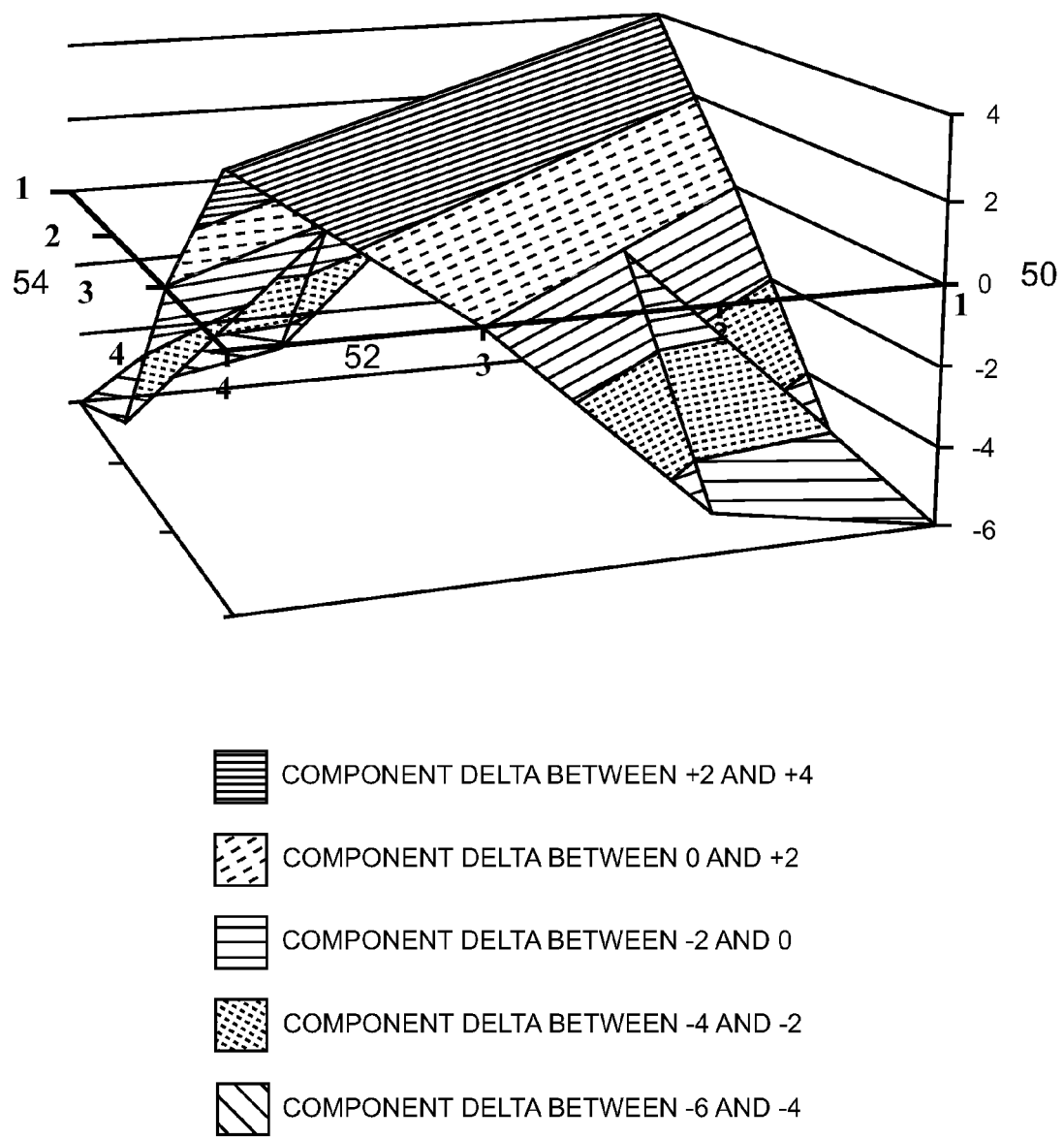
FIG. 8 shows a diagonal embodiment example.

Some example surfaces (slope, impulse and diagonal) are shown in FIGS. 6, 7, and 8. FIG. 6 is an "unidirectional slope" example. In each of the example surfaces, the figure's vertical axis represents the unweighted component delta 50 (the difference between the pixel component value at that position and a mean pixel value), horizontal image axis 52 represents 4 pixels along one dimension of the image (e.g. the horizontal dimension) and receding or vertical image axis 54 represents the other dimension of the image (e.g. the vertical dimension). The differing compressed blocks are identified below each figure. In this example the component deltas are increasing linearly in only one of the image dimensions. This case has two possible orientations each with positive or negative slope. FIG. 7 is a "corner impulse" example. Here the component deltas are peaking in one corner of the 4×4 array. This case has four possible orientations each with positive or negative slope. FIG. 8 is a "diagonal" example. Here the component deltas are peaking in along the diagonal of the 4×4 array. This case has two possible orientations each with positive or negative slope.

After picking the coded surface (C) to use, the algorithm calculates a weighting factor (W) to apply to the surface using the mean of absolute differences. It then generates the 4×4 prediction and calculates the $1^{st}$ order error terms. The combined size of the (now larger) header and the variable length code encoding all of the error terms is then stored for the first order case. In this case the compressed block would be stored as T, M, $C_1$, $W_1$, {error terms} where T indicates the coding type (first order in this case). $C_1$ and $W_1$ are all variable length coded encoded, noting that some surface types C are far more likely than others.

The stage is then repeated as the second order stage. This performs the same calculations but uses the error terms from the first order stage as its input. This allows a bidirectional slope to be predicted with different gradients in each dimension. If this is successful, the block is stored as T, M, $C_1$, $W_1$, $C_2$, $W_2$, {error terms}.

Figure 9:
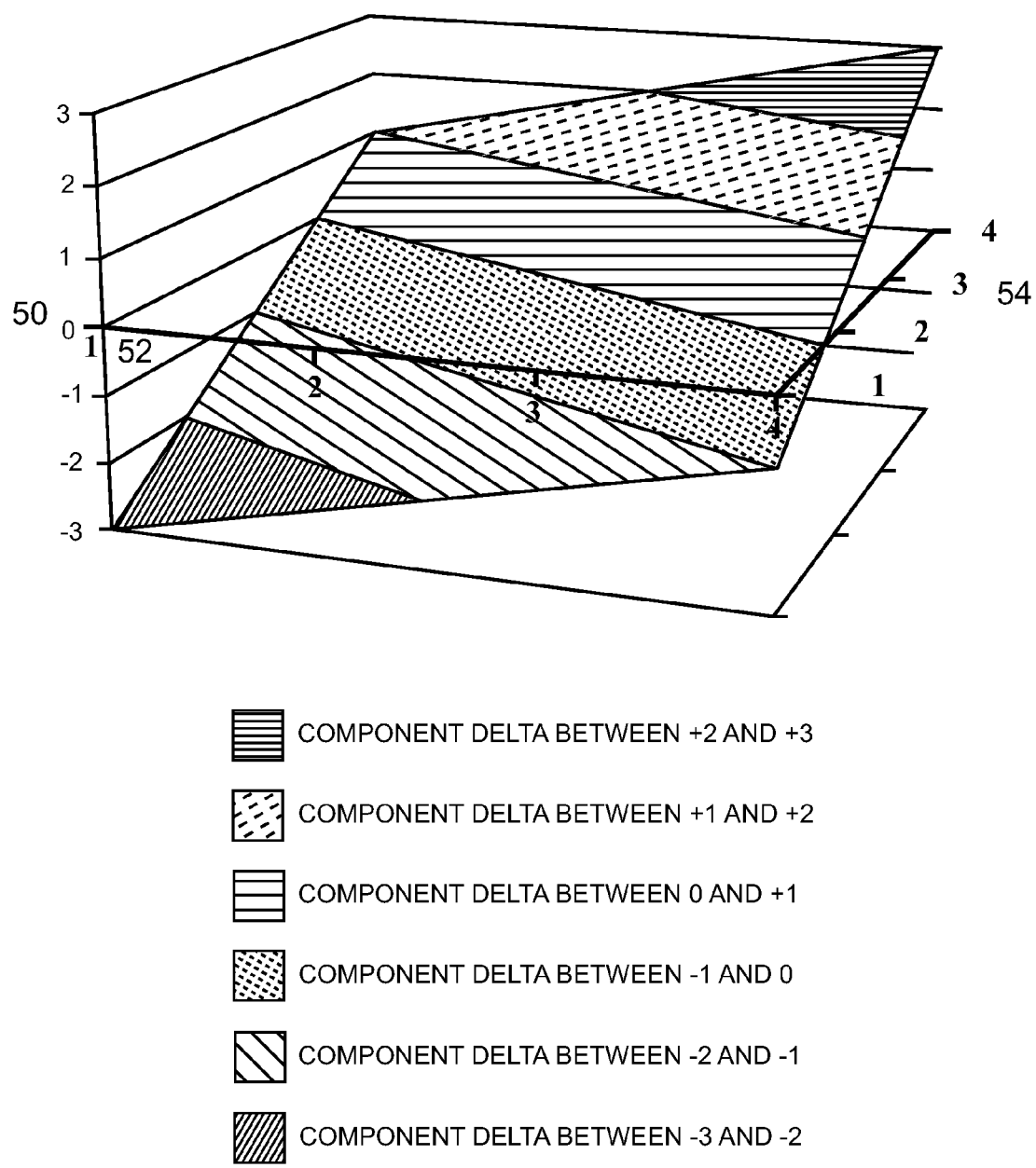

A simple example of the predicted surface after the second order stage is an arbitrary two-dimensional slope as shown in FIG. 9.

Figure 10:
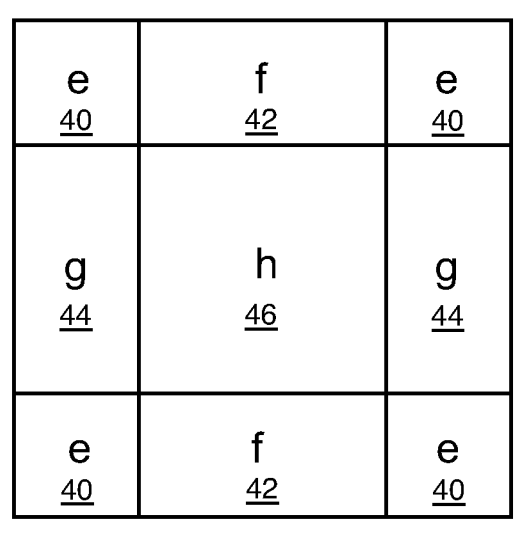

For the third order stage the four 2×2 sub-blocks are re-calculated as shown in FIG. 10. Here, all the pixels e 40 are considered as one sub-block and similarly for the f 42 and g 44 pixels.

Figure 11:
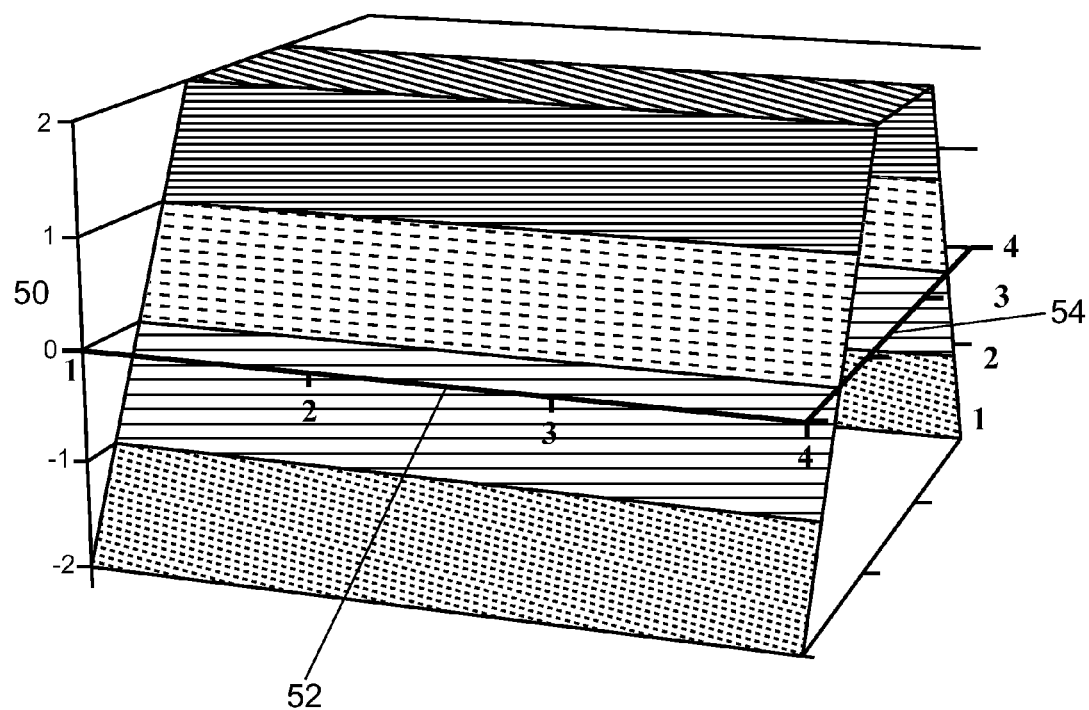
FIG. 11 shows a class map for a "ridge".
Figure 12:
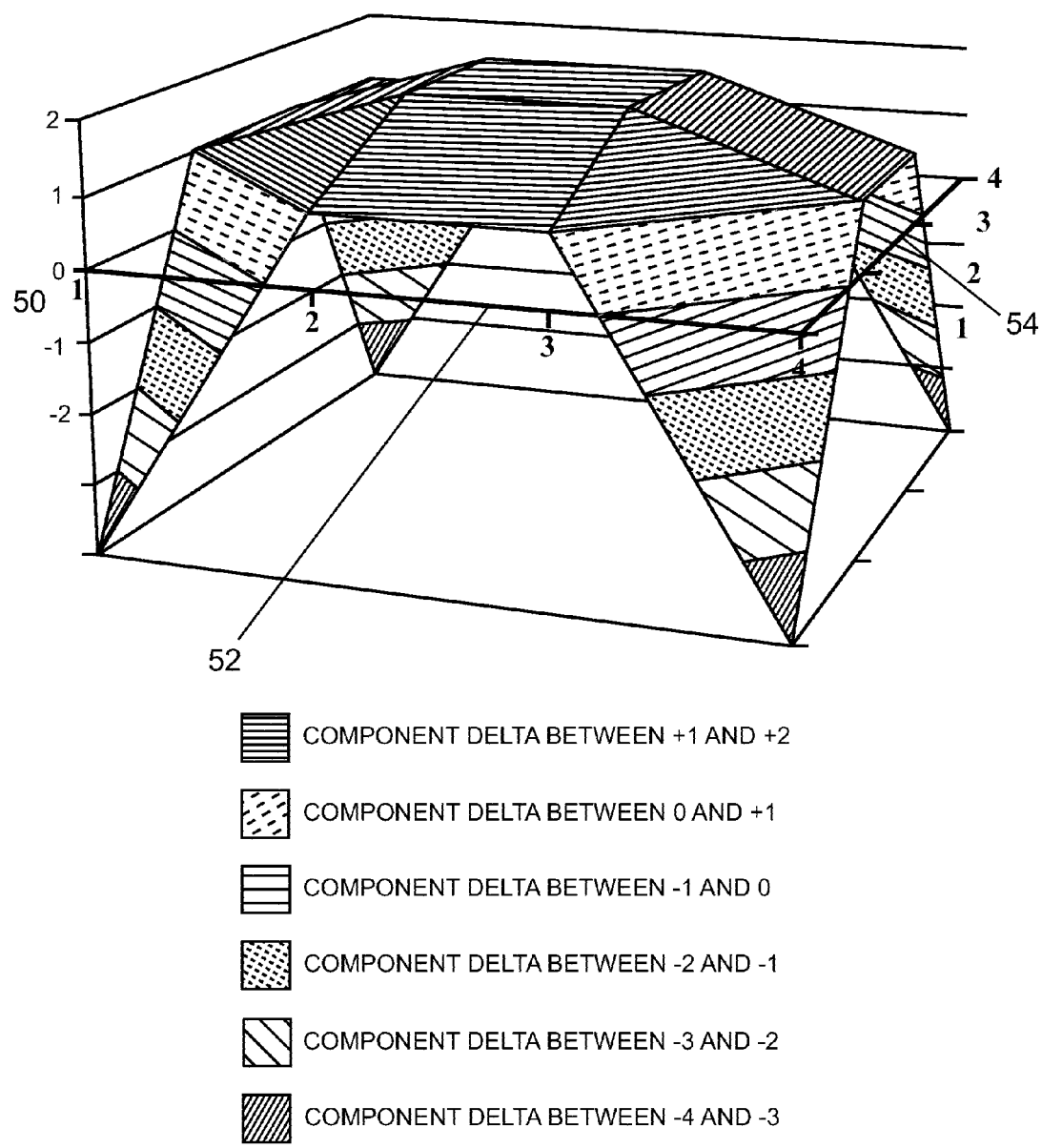
FIG. 12 shows a class map for a "centre impulse".
Figure 13:
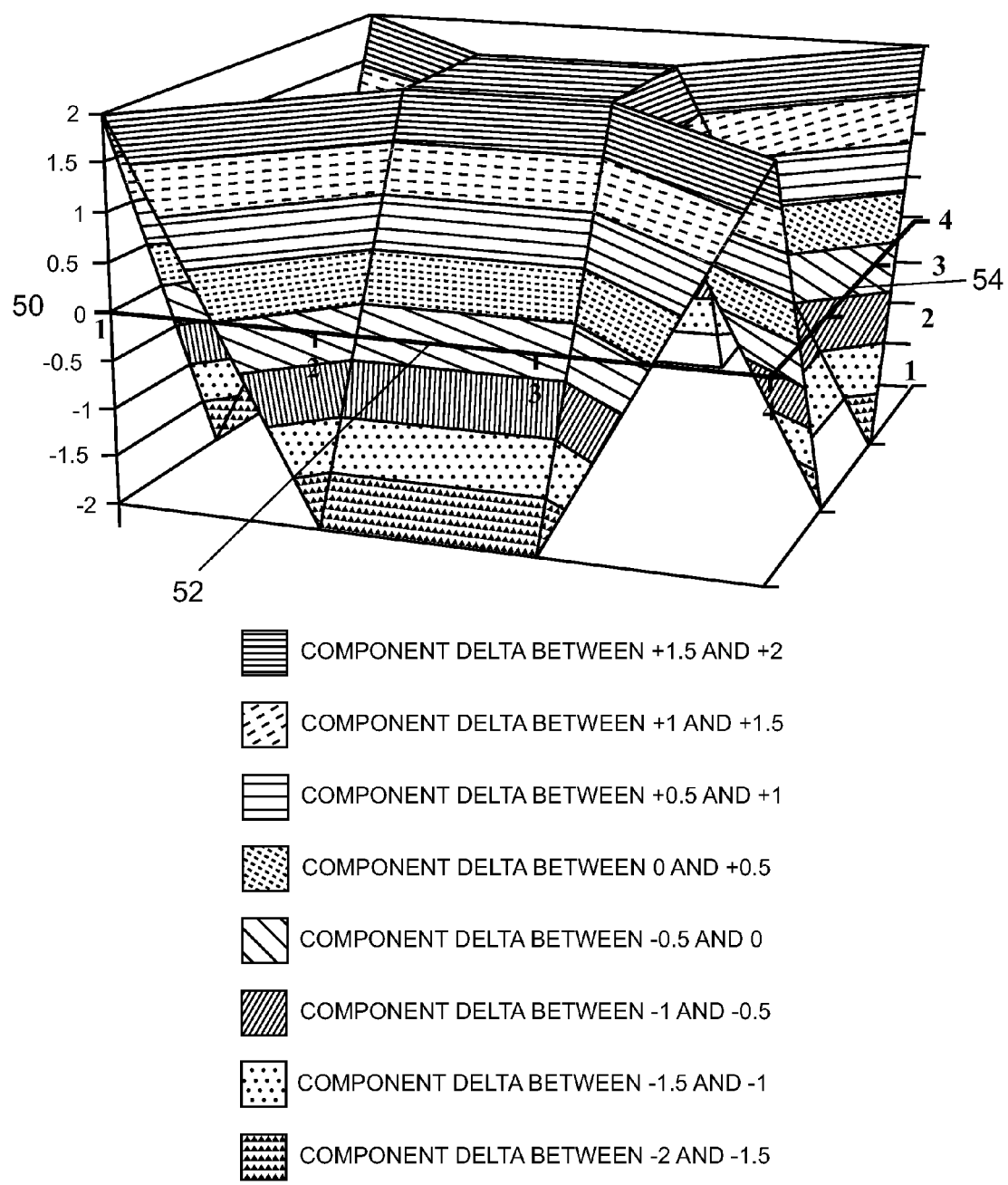
FIG. 13 shows a class map for a "checker board".
Figure 14:
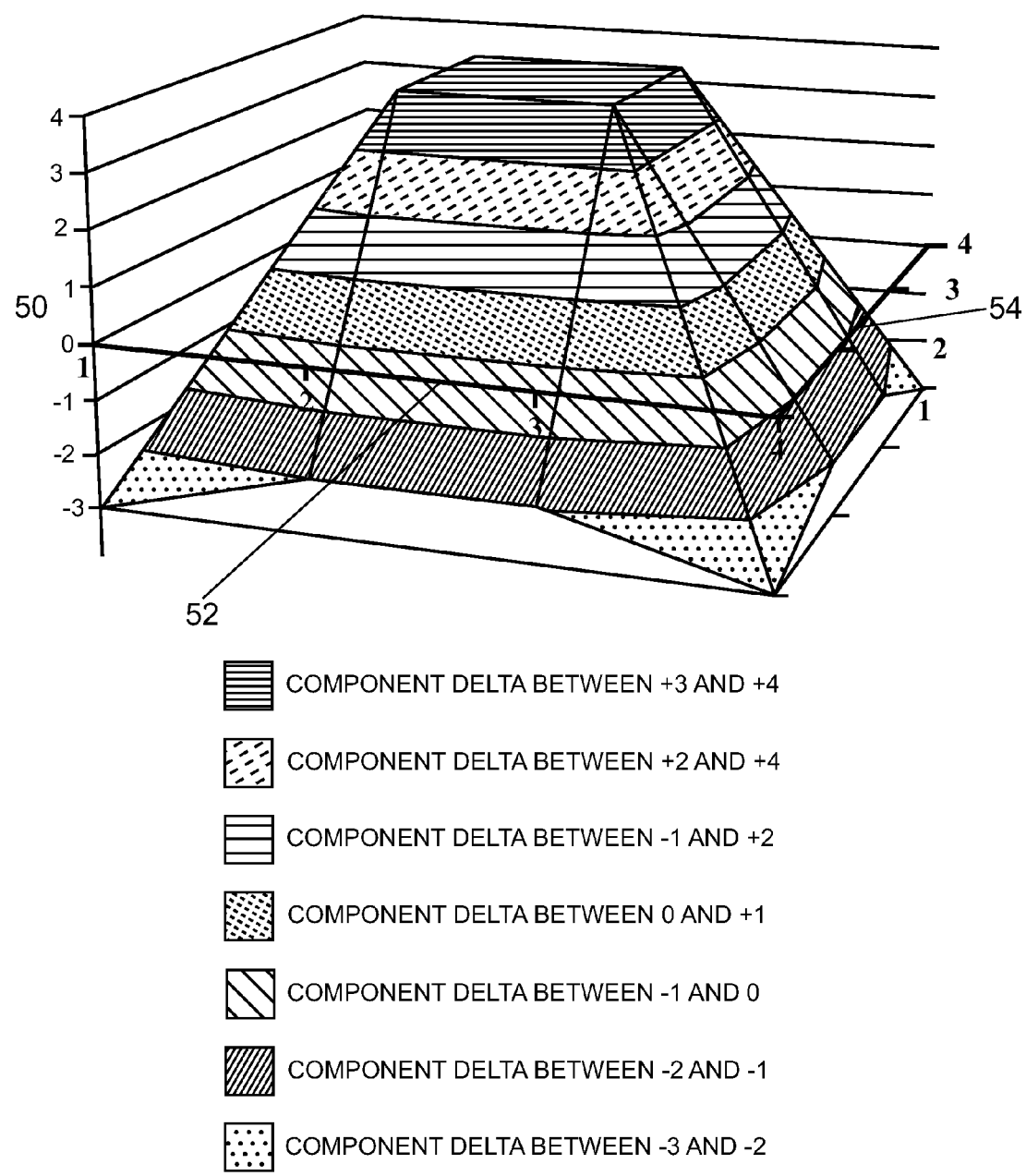
FIG. 14 shows a class map for a "peak".
Figure 15:
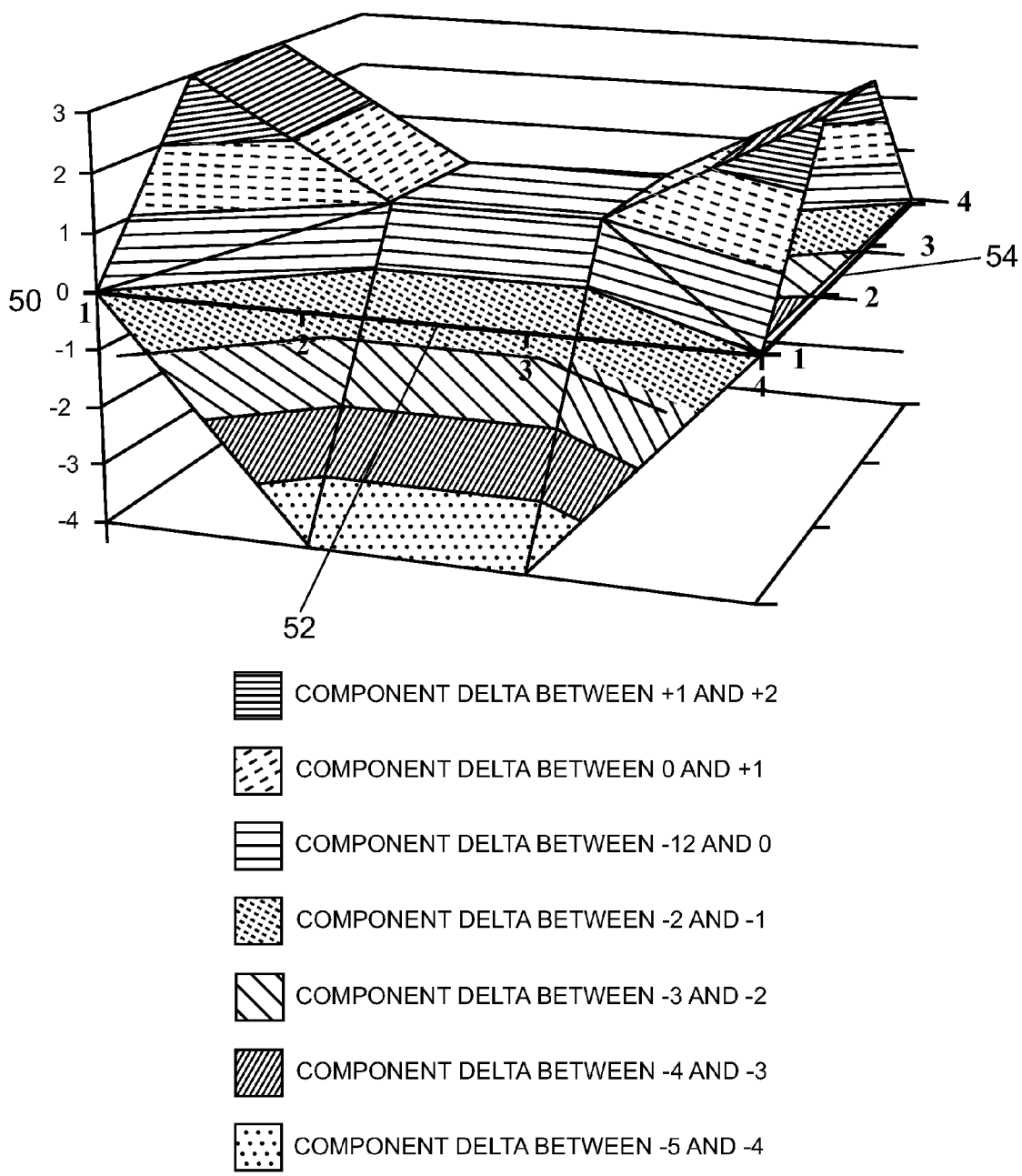
FIG. 15 shows a class map for a "saddle".

There are sixteen possible sign maps, which can be divided into seven classes "flat", "ridge", "centre impulse", "checker board", "peak", "saddle" and "impossible". These preliminary maps are shown as follows: "ridge" in FIG. 11; "centre impulse" in FIG. 12; "checker board" in FIG. 13; "peak" in FIG. 14, and "saddle" in FIG. 15. As with the previously disclosed surfaces, in each of the example surfaces, the figure's vertical axis represents the unweighted component delta 50 (the difference between the pixel component value at that position and a mean pixel value), horizontal image axis 52 represents 4 pixels along one dimension of the image (e.g. the horizontal dimension) and vertical image axis 54 represents the other dimension of the image (e.g. the vertical dimension). The differing compressed blocks are identified below each figure.

The third order stage is then calculated the same way as the second order stage, taking the error terms of the second stage as its input. If this is successful, the block is stored as T, M, $C_1$, $W_1$, $C_2$, $W_2$, $C_3$, $W_3$, {error terms}.

A fourth order stage can be used where the surfaces represent the ½ frequencies but this may have almost no coding gain.

Figure 16:
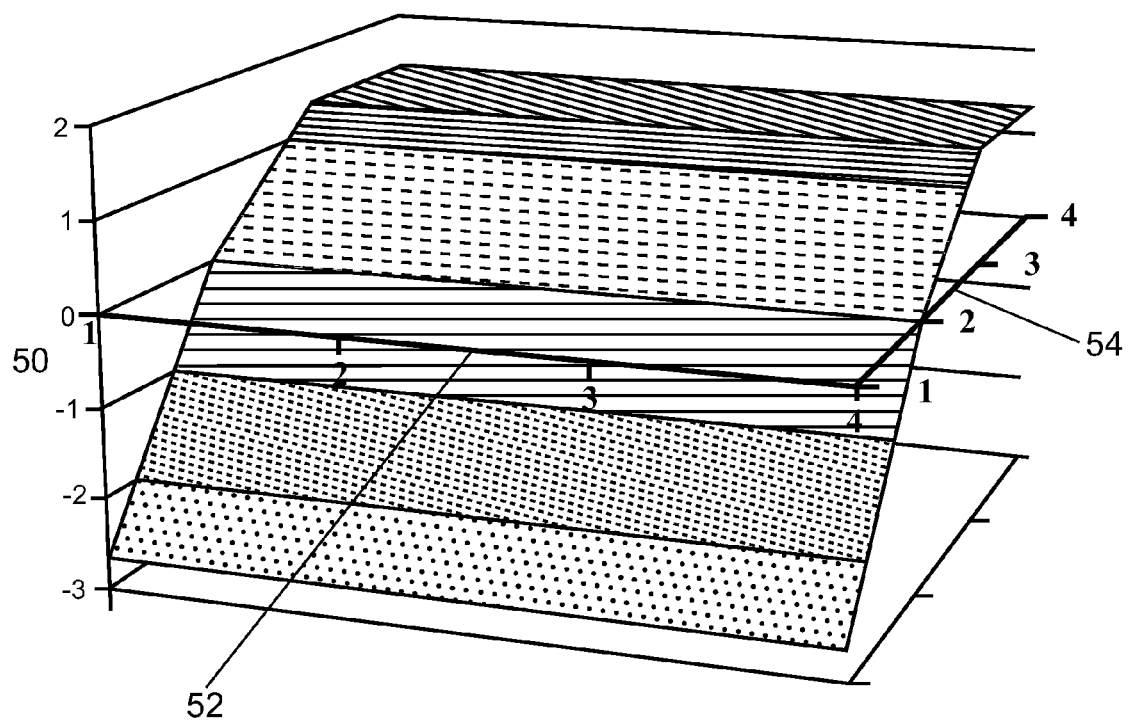
FIG. 16 shows an example of a combination of a 1st order and 3rd order surface "slope plus ridge".
Figure 17:
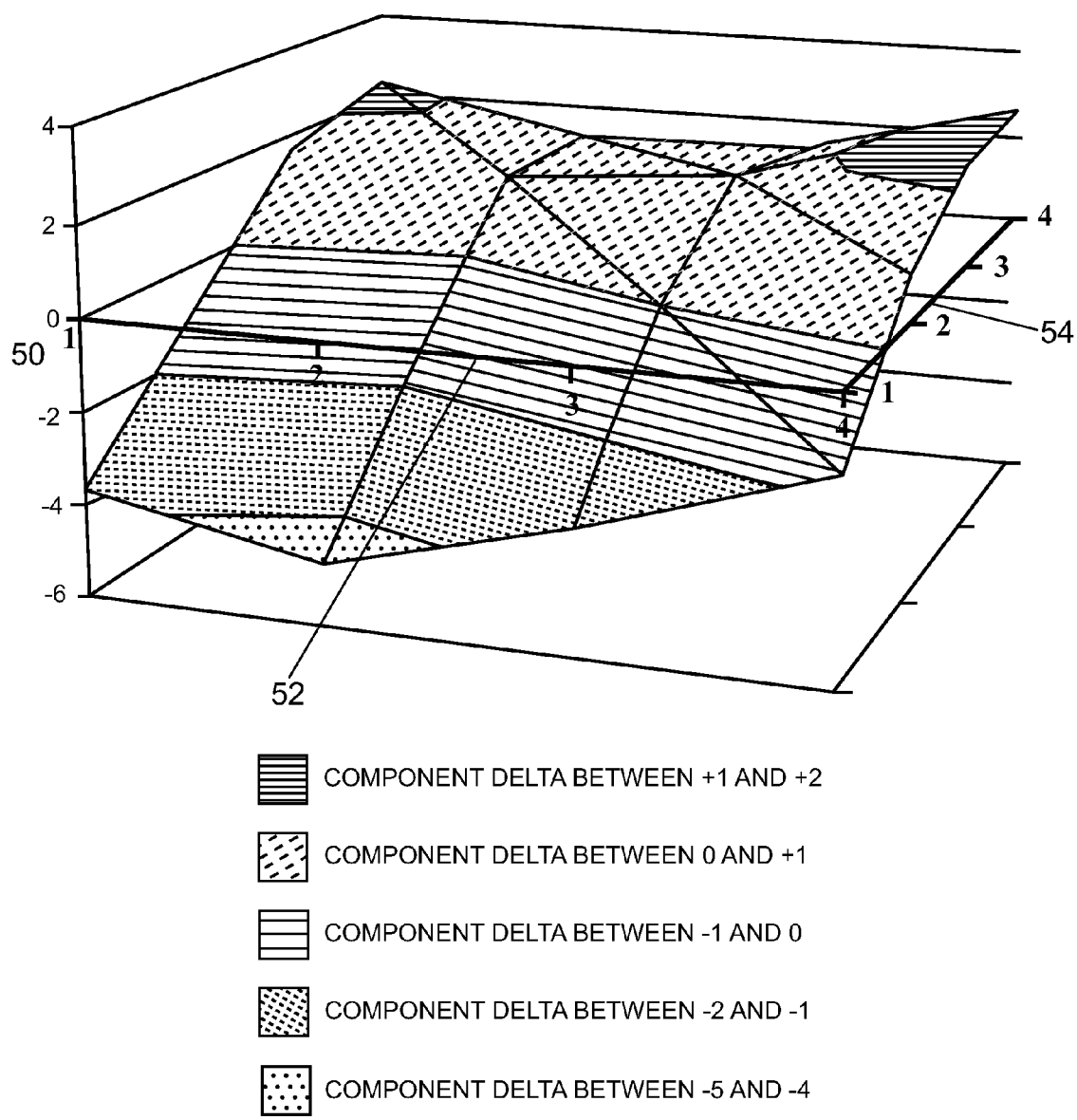
FIG. 17 shows an example of an arbitrary surface possible with three stages.

Some coding gain is possible if other combinations using the third order stage are considered, e.g., T, M, $C_3$, $W_3$, {error terms} or T, M, $C_1$, $W_1$, $C_3$, $W_3$, {error terms}. An example of a simple combination of a first order and third order surface (slope plus ridge) is shown in FIG. 16. An example of an arbitrary surface possibly with three stages is shown in FIG. 17.

For subsequent blocks in a chunk, the M value is coded differentially from the previous block. Depending on the previous block's coding type, the new M value is also predicted from the previous using the slope direction and weighting factor before encoding the difference. For interleaved chroma data, an initial absolute M is used for each component. This disclosure is not intended to be limited to the surfaces presented. Other surfaces are intended to be included with different or additional sign maps.

The bitstream is a sequence of variable size symbols. The size of each symbol is determined by the context and the symbol itself. Symbols are packed into bytes left-justified. Bytes are stored in little endian order (first byte at the lowest byte address). This may appear as an unusual combination of big and little endian ordering, but is entirely consistent with how Motion Picture Experts Group (MPEG) bitstreams are stored in systems operating in little endian byte order. The bitstream syntax is defined by the following pseudocode:

```
compressed_chunk {
    first_block
    for (i=1; i<NUM_BLOCKS_PER_CHUNK; i++) {
        block
    }
}
first_block {
    type                    2 bits
    mean                    8 or 10 bits
    surfaces
    errors
}
block {
    repeat                  1 bit
    if (repeat==0) {
        type                2 bits (Table 5 Type Codes)
    }
    delta_mean
    surfaces
    errors
}
delta_mean {
    magnitude               VLC (Table 1 Weighting
                            Factor Codes)
    if (magnitude !=0) {
        sign                1 bit (0=positive, 1=negative)
    }
}
surfaces {
    for (i=0; i<num_surfaces; i++) { See Table 5 Type Codes for
                                    num_surfaces
        weighting_factor            VLC (Table 1 Weighting
                                    Factor Codes)
        if ((weighting_factor != 0) && (repeat == 0)) {
            sign_map_code           VLC (Table 3 Sign Map
                                    Codes A)
        }
    }
}
errors {
    for (y=0; y<4; y++) {
        for (x=0; x<4; x++) {
            error[y][x]             VLC (Table 2 Error Term Codes)
        }
    }
}
```

When a chunk is not compressed, the raw pixel data is reordered within the bitstream to be more consistent with the dataflow of compressed chunks. The bitstream syntax is defined by the following pseudocode:

```
uncompressed_chunk {
    for (i=0; i<NUM_BLOCKS_PER_CHUNK; i++) {
        uncompressed_block
    }
}
uncompressed_block {
    for (y=0; y<4; y++) {
        for (x=0; x<4; x++) {
            pixel[y][x]             8 or 10 bit pixel
        }
    }
}
```

To support lossless compression it is assumed that some chunks cannot be compressed at all and, therefore, there is no coding space left within a chunk to indicate whether it is compressed or not. Therefore, the compression indication is stored out-of-band, meaning that the information is stored elsewhere.

The compression indicator is a two bit field per chunk, indicating that the chunk is not compressed, compressed to 50%, 75% or 87.5%.

A possible alternative mechanism where the 87.5% indication is not required, would be to store five three-way indicators per eight bits, thereby reducing the out-of-band storage requirement by 20%.

An instance of the engine is intended to be located at each client device. This is preferable to locating a general purpose instance of it in the memory controller due to the differing requirements of each device. The video decoder requires aligned ordered block write access and independent unaligned random block read access, the display pipeline (CPIPE) requires ordered scanline read access.

The memory-based video processor used for scaling the video also requires ordered scanline read access, but does not require any compressed write access despite being a memory to memory processor. This is because it either operates in a streaming mode (where the output is streamed directly to the display pipeline (CPIPE) or because it only writes back to memory when downscaling by a factor of two or more, and then the downscaling has effectively reduced the bandwidth to less than 25% making compression redundant.

Aligned ordered block writes are the easiest to handle because they can be naturally compressed as a unit and because blocks are stored linearly in main memory. Therefore, no additional buffering is required. As the block arrives at the compressor, it gets compressed and then it is written to memory using a single memory transaction. Writes are inherently simpler than reads because the compressed size is known at the time that memory transaction is requested.

Random block reads are the next easiest to handle because again they can be naturally decompressed as a unit, and because blocks are stored linearly in main memory. However, the video decoder requires unaligned block access and variable block sizes to handle motion compensation. This problem is addressed by the video decoder's block-based read cache which converts unaligned requests into fixed size aligned requests. The excess pixel data fetched due to the realignment and resizing is kept in the cache and has a reasonably high probability of being required in a subsequent random access.

Figure 18:
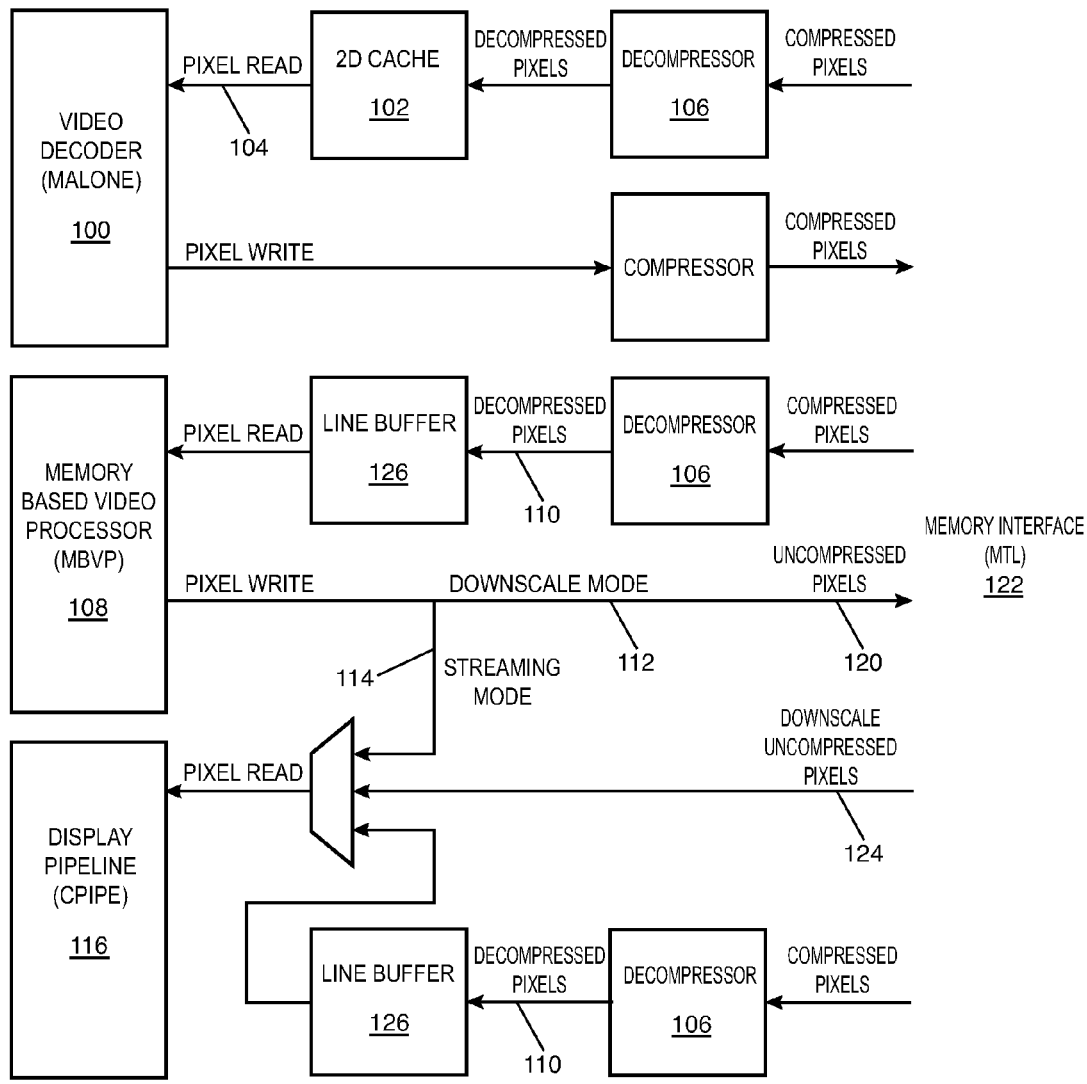
FIG. 18 shows the basic system architecture of the preferred embodiment.

Ordered scanline reads require a change to the system to operate efficiently because at least three additional scanlines worth of data must be buffered before the first pixel becomes available. Without this buffering the bandwidth would increase, not decrease, because blocks would have to be repeatedly reread and decompressed. The basic system architecture is shown in FIG. 18. FIG. 18 only shows the flow of pixels when operating in a bandwidth compression mode, there are bypasses available to avoid compression if necessary.

Video decoder 100, such as a high definition/ultra high definition video decoder, uses an on-chip 2D cache 102 to improve memory efficiency when reading arbitrary two dimension blocks of pixels 104. Due to the random access nature of pixel reads, the sideband information used to store the compression level (none/50%/75%) must be buffered to avoid reducing memory efficiency. Each reference frame at 4K resolution (3840×2160) with 32×4 pixel blocks requires 12 KB of storage for single level compression (none/50%) and 24 KB for multi-level compression (none/50%/75%). The maximum number of frames in use at a time is 6, totaling 72 KB or 144 KB of on-chip storage.

Memory Based Video Processor 108 will operate in one of three modes:
  Bypass Memory Based Video Processor 108, no scaling required, so no processing required by Memory Based Video Processor 108;
  Partial downscale, scaling required but by a ratio less than but close to 1 whereby Memory Based Video Processor 108 receives decompressed pixels 110, downscales them 112 and streams them 114 to video pipeline 116; and
  Full downscale, significant scaling required that implies output 120 must be written back to main memory 122 because Memory Based Video Processor 108 cannot keep up with the input data rate required to stream the output to video pipeline 116. However at these ratios the output bandwidth is much lower and therefore compression is of reduced value. In this mode video pipeline 116 receives downscaled uncompressed pixels 124.

In either mode (ignoring the bypass mode) Memory Based Video Processor 108 receives decompressed pixels from the decompressor 106. However to avoid having to reread blocks, the blocks are stored in a buffer 126 equivalent to at least 3 scanlines in size. Memory Based Video Processor 108 cannot start receiving pixels until entire buffer 126 has been filled with decompressed pixels.

Video pipeline or display pipeline (CPIPE) 116 will only accept decompressed pixels 110 from memory 122 when Memory Based Video Processor 108 is in bypass mode (no scaling). In this mode it will decompress in the same manner as described above for Memory Based Video Processor 108 using a similar buffer 126.

It may well be possible to avoid needing decompressor 106 before display pipeline (CPIPE) 116 if the no-scaling case also passes through Memory Based Video Processor 108, with Memory Based Video Processor 108 performing no processing but just providing a path to go through its decompressor 106.

Microarchitecture

The Decompressor Data Engine (DDE) accepts compressed input data and commands and generates decompressed output data. It is not concerned with memory addressing or buffer formats. The engine operates on individual chunks of data, where a chunk represents a single component (Y, Cb or Cr) of a 2D array of pixels. In this description a "pixel" refers to just one component part of a pixel.

The input data is a sequence of data words containing the compressed bitstream. The number of data words that it expects is determined by the command. Note that while the number of useful bits in the bitstream is variable, the bitstream data is always data word aligned and always an integer number of data words, implying that it may be padded with unused trailing data. The word size is configurable.

The output data is a sequence of data words containing packed decompressed pixel components. The number of data words to expect is determined by the command. Note that the pixel data is always word aligned, there are always an integer number of pixels in a word, and always an integer number of data words in a sequence. The number of pixel components in a word is configurable and the number of bits per pixel is configurable. The engine can operate in reduced bits per pixel modes where the least significant bits of each pixel will be padded with zeros. For example if the configuration is ten bits per pixel then it will also support 8 bits per pixel with 2 bits of padding. The default configuration is sixty-four bit input, ten bits per pixel, and four pixels per output word (forty bit output).

The input bitstream is a continuous stream of variable size symbols. The output is a sequence of pixels in scanline order within each block, i.e. the pixels are output in 4×4 blocks from left to right and from left to right, and then top to bottom within the block. The pixels are presented in little endian order, i.e. the leftmost pixel is in the least significant part of the word. The engine has no knowledge of the frame buffer format, the pitch of the buffer, the chunk organization, the pixel storage format, how different pixel components are related, etc.

The Decompressor Data Engine (DDE) supports the following commands:

| | | |
|---|---|---|
| 0 | DDE_CMD_32_4_8_PASSTHRU | Passthrough uncompressed 32 × 4 8 bpp pixel chunk |
| 1 | DDE_CMD_32_4_8_50 | Decompress 50% compressed 32 × 4 8 bpp pixel chunk |
| 2 | DDE_CMD_32_4_8_75 | Decompress 75% compressed 32 × 4 8 bpp pixel chunk |
| 3 | Reserved | |
| 4 | DDE_CMD_32_4_10_PASSTHRU | Passthrough uncompressed 32 × 4 10 bpp pixel chunk |
| 5 | DDE_CMD_32_4_10_50 | Decompress 50% compressed 32 × 4 10 bpp pixel chunk |
| 6 | DDE_CMD_32_4_10_75 | Decompress 75% compressed 32 × 4 10 bpp pixel chunk |
| 7 | Reserved | |

Figure 19:
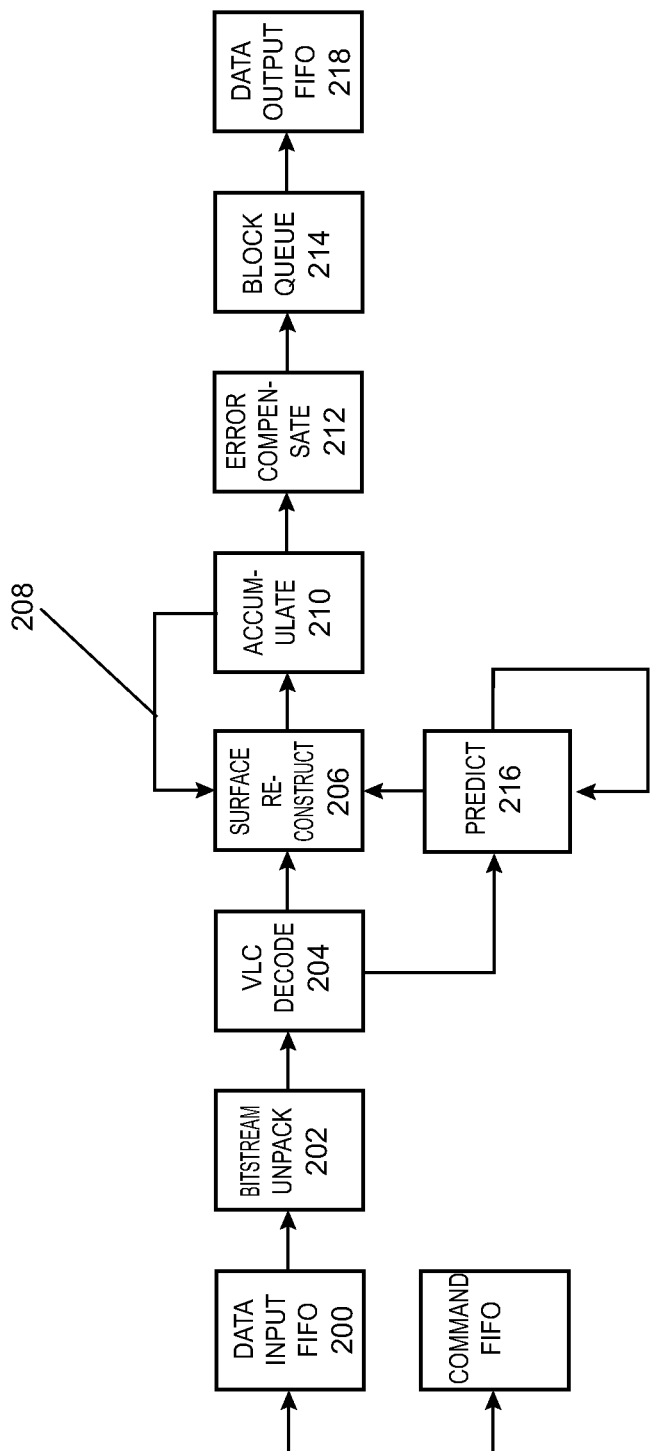
FIG. 19 is a block diagram that shows the dataflow inside the Decompressor Data Engine (DDE).

FIG. 19 is a block diagram that shows the dataflow inside the Decompressor Data Engine (DDE).

Bitstream unpacker 202 removes successfully decoded symbols from data input FIFO 200 bitstream input. VLC decoder 204 decodes the various symbols based on the context and prediction 216. Surface reconstructor 206 takes the decoded symbols and constructs the initial surface. On subsequent passes, it constructs additional surfaces 208 to be accumulated 210. After all the surfaces have been added together the final output is error compensated 212 and added to the queue of completed blocks 214 to data output FIFO 218.

Figure 20:
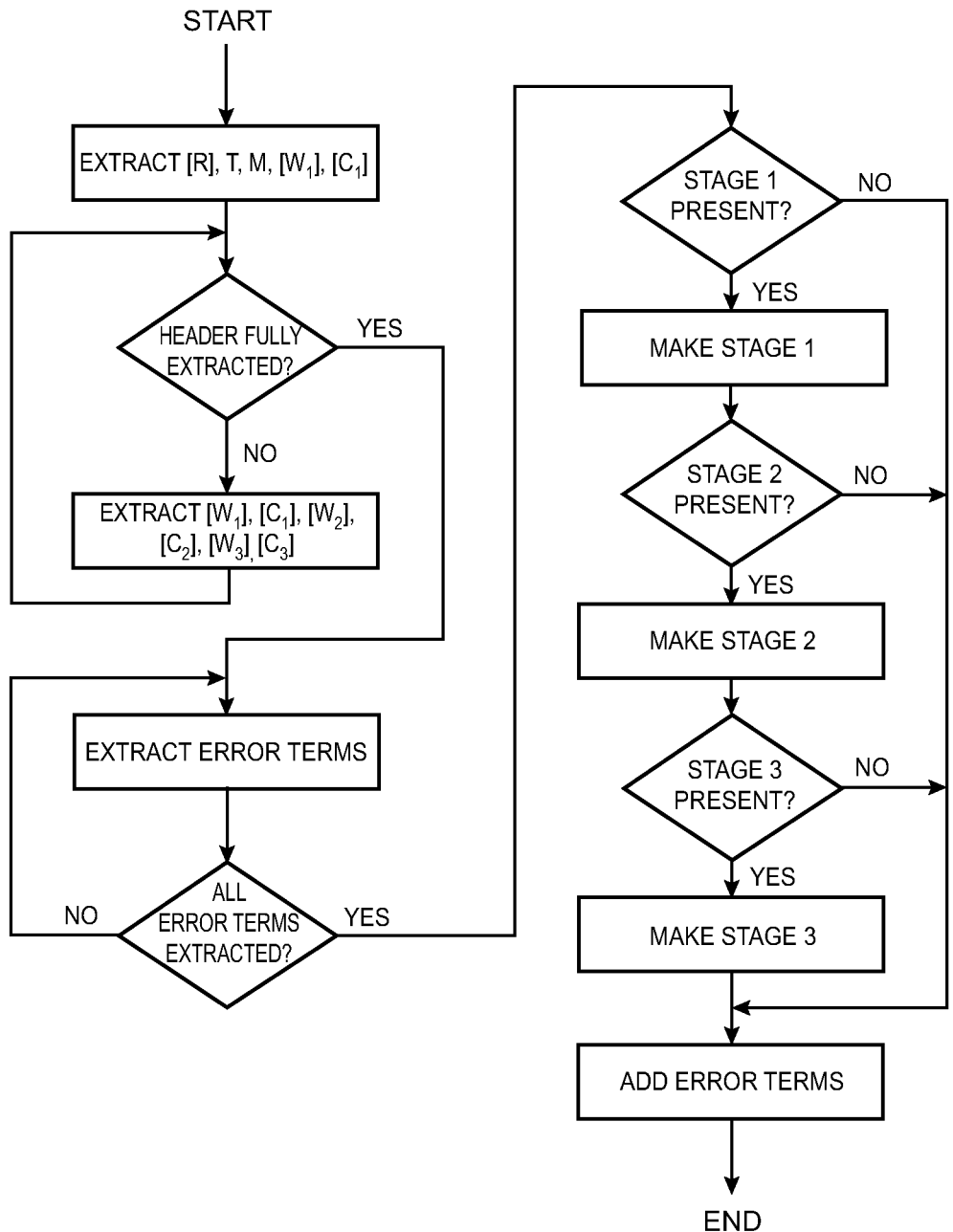
FIG. 20 is a flow chart that shows the control flow in the decompressor.

FIG. 20 is a flow chart that shows the control flow in the decompressor. The process blocks are clock cycle stages and the conditional blocks are combinational logic. The values shown in square brackets are data dependent and may or may not be present and may have been processed in the previous cycle.

The Compressor Data Engine (CDE) accepts uncompressed input data and commands and generates compressed output data. It is not concerned with memory addressing or buffer formats. The engine operates on individual chunks of data, where a chunk represents a single component (Y, Cb or Cr) of a 2D array of pixels. In this description a "pixel" refers to just one component part of a pixel.

The output data is a sequence of data words containing the compressed bitstream. The number of data words to expect is implied by the value in the status word. Note that while the number of useful bits in the bitstream is variable, the bitstream data is always data word aligned, and always an integer number of data words, implying that it may be padded with unused trailing data. The word size is configurable.

The input data is a sequence of data words containing packed uncompressed pixel components. The number of data words to expect is determined by the command. Note that the pixel data is always word aligned, there are always an integer number of pixels in a word, and always an integer number of data words in a sequence. The number of pixel components in a word is configurable and the number of bits per pixel is configurable. The engine can operate in reduced bits per pixel modes where the least significant bits of each pixel should be padded with zeros. For example if the configuration is ten bits per pixel then it will also support eight bits per pixel with two bits of padding. The default configuration is four pixels per input word, ten bits per pixel (forty bit input), and sixty-four bit output word.

The output bitstream is a continuous stream of variable size symbols. The input is a sequence of pixels in scanline order within each 4×4 block, i.e. the pixels are input in blocks from left to right and from left to right, and then top to bottom within the block. The pixels are presented in little endian order, i.e. the leftmost pixel is in the least significant part of the word. The engine has no knowledge of the frame buffer format, the pitch of the buffer, the chunk organization, the pixel storage format, how different pixel components are related, etc.

The Compressor Data Engine (CDE) supports the following commands:

| Value | Name | Description |
|---|---|---|
| 0 | CDE_CMD_32_4_8 | Compress a 32 × 4 8 bpp pixel chunk |
| 1 | CDE_CMD_32_4_10 | Compress a 32 × 4 10 bpp pixel chunk |

Status

The Compressor Data Engine (CDE) generates the following status:

| Value | Name | Description |
|---|---|---|
| 0 | CDE_STATUS_IDLE | Engine is idle |
| 1 | CDE_STATUS_BUSY | Engine is busy on intermediate cycle of a chunk |
| 2 | CDE_STATUS_LAST | Engine is on the last cycle of a chunk |
| 8 | CDE_STATUS_32_4_8_PASSTHRU | First cycle of 32 × 4 8 bpp pixel chunk that was not compressed |
| 9 | CDE_STATUS_32_4_8_50 | First cycle of 32 × 4 8 bpp pixel chunk that was compressed to 50% |
| 10 | CDE_STATUS_32_4_8_75 | First cycle of 32 × 4 8 bpp pixel chunk that was compressed to 75% |
| 11 | Reserved | |
| 12 | CDE_STATUS_32_4_10_PASSTHRU | First cycle of 32 × 4 10 bpp pixel chunk that was not compressed |
| 13 | CDE_STATUS_32_4_10_50 | First cycle of 32 × 4 10 bpp pixel chunk that was compressed to 50% |
| 14 | CDE_STATUS_32_4_10_75 | First cycle of 32 × 4 10 bpp pixel chunk that was compressed to 75% |
| 15 | Reserved | |

The status word is valid on every cycle but is also flow controlled by the data flow control, i.e. the "first" status indication does not change until the input data is valid and accepted, and the "last" status indication does not change until the last output data is valid and accepted.

Figure 21:
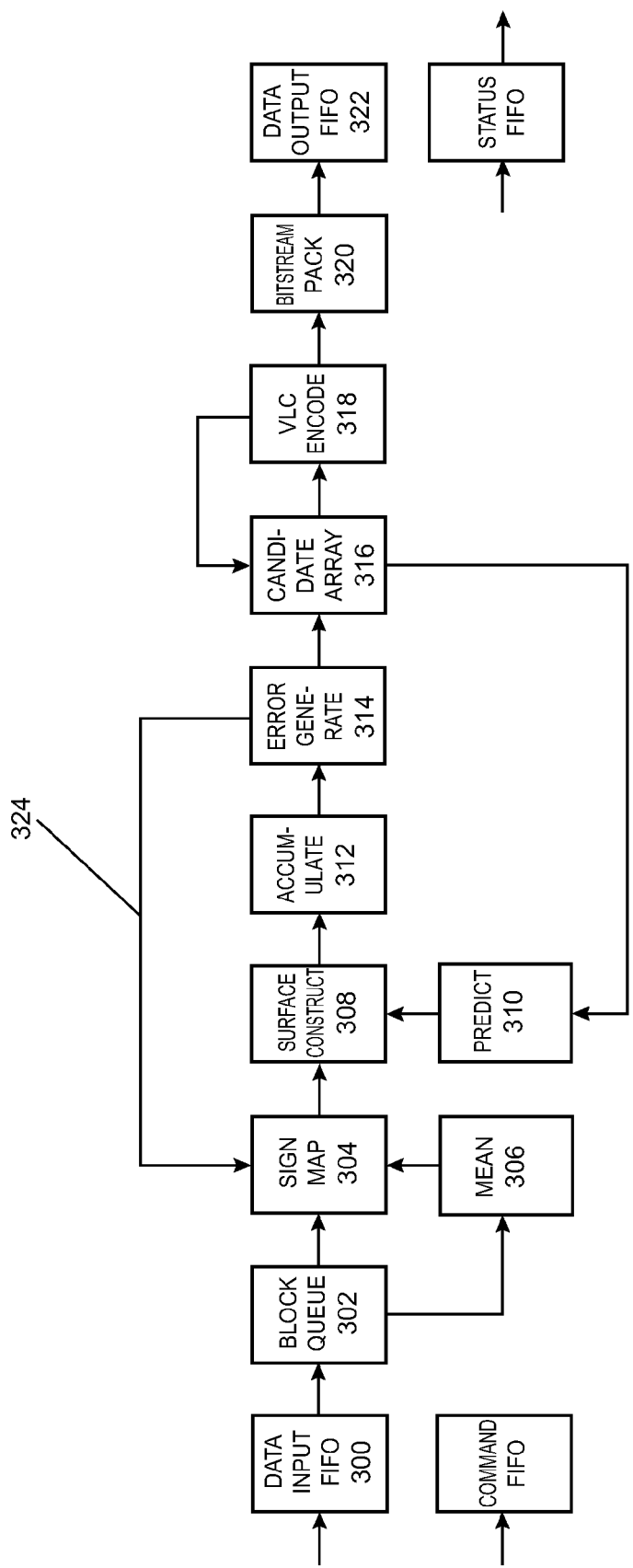
FIG. 21 is a block diagram showing the dataflow inside the Compressor Data Engine (CDE).

FIG. 21 is a block diagram showing the dataflow inside the Compressor Data Engine (CDE)

Block queue 302 assembles incoming data 300 into the appropriate 4×4 blocks suitable for parallel processing. Mean unit 306 calculates the mean of the incoming block (the $0^{th}$ order surface) which is then used by the comparator in sign map 304 to generate the code for the best surface which is then used construct the 1st order surface 308. Subsequent order surfaces are accumulated 312 and compared with the original block to generate error terms 314. The error block is then fed back 324 to generate the codes for the higher order surfaces. After each pass the results are stored in candidate array 316 and the total VLC size is encoded and calculated 318. On completing all necessary passes, the best candidate from the candidate array is chosen to be used in the actual bitstream generation 320 for data output 322. Subsequent blocks within a chunk use the prediction unit 310 to predict the mean and surface type coding from the previous block.

Below are the Tables referred to above:

Weighting factors are coded as shown in the following tables:

TABLE 1

| Value | VLC |
|---|---|
| 0 | 1 |
| 1 | 01 |
| 2 | 001 |
| 3 | 00010 |
| 4 | 00011 |
| 5 | 0000100 |
| 6 | 0000101 |
| 7 | 0000110 |
| 8 | 0000111 |
| 9-16 | 000001000-000001111 |
| 17-32 | 00000010000-00000011111 |
| 33-64 | 0000000100000-0000000111111 |
| 65-128 | 000000001000000-000000001111111 |
| 129-256 | 0000000000100000000-00000000011111111 |
| 257-512 | 00000000001000000000-00000000001111111111 |
| 513-1024 | 000000000001000000000-000000000001111111111 |

If a weighting factor is zero, the corresponding sign map code is skipped.

Error terms are coded as follows:

TABLE 2

| Value | VLC | |
|---|---|---|
| 0 | 10 | |
| 1 | 11s | |
| 2 | 010s | |
| 3 | 011s | |
| 4 | 0010s | |
| 5 | 0011s | |
| 6 | 000100s | |
| 7 | 000101s | |
| 8 | 000110s | |
| 9 | 000111s | |
| 10-17 | 00001000s-00001111s | |
| 18-33 | 0000010000s-0000011111s | |
| 34-65 | 000000100000s-000000111111s | |
| 66-129 | 00000001000000s-00000001111111s | |
| 130-257 | 0000000010000000s-0000000011111111s | |
| 258-513 | 000000000100000000s-000000000111111111s | |
| 514-1025 | 00000000001000000000s-00000000001111111111s | |
| No errors | 0000000001 | 8 bit mode only |

TABLE 2-continued

| Value | VLC | |
|---|---|---|
| No errors | 000000000001 | 10 bit mode only |

For non-zero values, the s bit is the sign.
The "no errors" cases are used to encode the situation where all 16 errors are zero.
The error terms for 12 bit video are not shown above.

Sign Map Codes A

These codes are used for C in orders 1 and 2. The occurrence of the "slope" type surface was found to far outweigh the other types.

TABLE 3

| Map | Code | VLC | Comment |
|---|---|---|---|
| + + <br> + + | 0000 | 001000 | Flat |
| − + <br> + + | 0001 | 0100 | Corner impulse |
| + − <br> + + | 0010 | 0101 | Corner impulse |
| − − <br> + + | 0011 | 100 | Slope |
| + + <br> − + | 0100 | 0110 | Corner impulse |
| − + <br> − + | 0101 | 101 | Slope |
| + − <br> − + | 0110 | 001001 | Diagonal |
| − − <br> − + | 0111 | 001010 | Corner impulse |
| + + <br> + − | 1000 | 0111 | Corner impulse |
| − + <br> + − | 1001 | 001011 | Diagonal |
| + − <br> + − | 1010 | 110 | Slope |
| − − <br> + − | 1011 | 001100 | Corner impulse |
| + + <br> − − | 1100 | 111 | Slope |
| − + <br> − − | 1101 | 001101 | Corner impulse |
| + − <br> − − | 1110 | 001110 | Corner impulse |
| − − <br> − − | 1111 | 001111 | Impossible |

Sign Map Codes B

These codes are used for C in order 3. The occurrence of the "ridge" type surface was found to far outweigh the other types.

TABLE 4

| Map | Code | VLC | Comment |
|---|---|---|---|
| + + <br> + + | 0000 | 001000 | Flat |
| − + <br> + + | 0001 | 0100 | Centre Impulse |
| + − <br> + + | 0010 | 0101 | Saddle |
| − − <br> + + | 0011 | 100 | Ridge |
| + + <br> − + | 0100 | 0110 | Saddle |
| − + <br> − + | 0101 | 101 | Ridge |

TABLE 4-continued

| Map | Code | VLC | Comment |
|---|---|---|---|
| + −<br>− + | 0110 | 001001 | Checker Board |
| − −<br>− + | 0111 | 001010 | Peak |
| + +<br>+ − | 1000 | 0111 | Peak |
| − +<br>+ − | 1001 | 001011 | Checker Board |
| + −<br>+ − | 1010 | 110 | Ridge |
| − −<br>+ − | 1011 | 001100 | Saddle |
| + +<br>− − | 1100 | 111 | Ridge |
| − +<br>− − | 1101 | 001101 | Saddle |
| + −<br>− − | 1110 | 001110 | Centre Impulse |
| − −<br>− − | 1111 | 001111 | Impossible |

Header Coding
Type Coding
The following table lists the values for the type code T:
First block of a chunk:

TABLE 5

| T | Code | Stages |
|---|---|---|
| 0 | 00 | 0 |
| 1 | 01 | 0, 1 |
| 2 | 10 | 0, 1, 2 |
| 3 | 11 | 0, 1, 2, 3 |
| Subsequent blocks: | | |
| 0 | 000 | 0 |
| 1 | 001 | 0, 1 |
| 2 | 010 | 0, 1, 2 |
| 3 | 011 | 0, 1, 2, 3 |
| 4 | 1 | Repeat previous |

T=4 is used to encode relative blocks where the type code and all the active sign map codes are identical to the previous block.

INDUSTRIAL EXAMPLES

These tests were performed with $3^{rd}$ order surface mapping, single level (50% cutoff) and dual level compression (50%/75%), and 32×4 8-bit pixel chunks. The percentages are the bandwidth required compared to normal.

TABLE 6

| File | Size | BW (50% cutoff) | BW (75% cutoff) | Comments |
|---|---|---|---|---|
| lake.jpg | 1920 × 1080 | 78.0% | 72.3% | JPEG photo with lots of high frequency detail |
| gun.jpg | 1920 × 1080 | 83.2% | 74.5% | JPEG photo with lots of in-focus detail |
| lots.jpg | 1920 × 1080 | 72.8% | 63.3% | Grainy film |
| fraiser.jpg | 1920 × 1080 | 55.2% | 53.5% | Typical HDTV frame grab |
| ski.jpg | 1920 × 1080 | 79.3% | 70.7% | 1080p video grab (from 8.3 Mbps WMV) |
| climb.jpg | 1920 × 1080 | 62.4% | 57.1% | 1080p video grab (from 8.3 Mbps WMV) |
| run.jpg | 1920 × 1080 | 64.8% | 61.2% | 1080p video grab (from 8.3 Mbps WMV) |
| mermaid.jpg | 1920 × 1080 | 58.9% | 55.6% | Sharp photo with soft background |
| chase.jpg | 1920 × 1080 | 59.8% | 55.5% | High motion with macroblocking effects from letterboxed 1080p video (8.3 Mbps WMV) |
| woods.jpg | 1920 × 1080 | 99.3% | 91.6% | Very high quality, high detail JPEG photo with no compression artifacts |
| maria.jpg | 1920 × 1200 | 75.5% | 64.2% | High quality JPEG photo |
| testcard.jpg | 1920 × 1080 | 61.6% | 58.1% | HD Test pattern |
| blossom.jpg | 1920 × 1200 | 76.6% | 75.6% | High quality JPEG photo |
| | | 71.3% | 65.6% | Average |

While various embodiments of the disclosed method and apparatus have been described above, it should be understood that they have been presented by way of example only, and should not limit the claimed invention. Likewise, the various diagrams may depict an example architectural or other configuration for the disclosed method and apparatus. This is done to aid in understanding the features and functionality that can be included in the disclosed method and apparatus. The claimed invention is not restricted to the illustrated example architectures or configurations, rather the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Several embodiments are specifically illustrated and/or described herein. However, it will be appreciated that modifications and variations of the disclosed embodiments are covered by the above teachings and within the purview of the appended claims without departing from intended scope of the invention.

The invention claimed is:

1. A method of compressing and decompressing digital video, the method comprising the steps of:
   a) dividing a video image into a two dimensional block structure;
   b) determining a surface map according to a difference between a mean of data values within the two dimensional block and a mean of data values within a plurality of sub blocks within the two dimensional block;
   c) applying a best fit, weight to the surface map to minimize differences;
   d) generating a plurality of variable length code (VLC) codes representing a plurality of encoding levels, a weight, a surface map, and a plurality of error terms for each level of mapping; and
   e) collecting VLC terms into a linear group of data.

2. The method of claim 1, wherein the method comprises iteratively processing error terms for additional surface mapping and for the reduction of bit encoding.

3. The method of claim 1, wherein the method comprises randomly accessing the linear group of data from a buffer.

4. The method of claim 1, wherein the method comprises fetching a first part of the linear group of data in a read operation and fetching a second part of the linear group of data if it is present.

5. The method of claim 1, wherein the method comprises indicating whether the linear group of data is compressed.

6. A system for compressing and decompressing digital video, the system comprising:
   a processor; and
   a memory storing instructions which when executed cause the processor to:
   divide a video image into a two dimensional block structure;
   determine a surface map according to a difference between a mean of data values within the two dimensional block and a mean of data values within a plurality of sub blocks within the two dimensional block;
   apply a best fit weight to the surface map to minimize differences;
   generate variable length code (VLC) codes representing a plurality of encoding levels, a weight, a surface map, and a plurality of error terms for each level of mapping; and
   collect VLC terms into a linear group of data.

7. The system of claim 6, wherein the processor is operable to process resulting error terms for additional surface mapping and reduce bit encoding.

8. The system of claim 6, wherein the processor is operable to randomly access the linear group of data.

9. The system of claim 6, wherein the processor is operable to fetch a first part of the linear group of data in a read operation and fetch a second part of the linear group of data if it is present.

10. The system of claim 6, wherein the processor is operable to indicate whether the linear group of data is compressed.

11. A non-transitory computer-executable storage medium comprising program instructions which are computer-executable to implement compressing and decompressing digital video comprising:
    program instructions that cause a division of a video image into a two dimensional block structure;
    program instructions that cause a determination of a surface map according to a difference between a mean of data values within the two dimensional block and a mean of data values within a plurality of sub blocks within the two dimensional block;
    program instructions that cause an application of a best fit weight to the surface map to minimize differences;
    program instructions that cause a generation of a plurality of variable length code (VLC) codes representing a plurality of encoding levels, a weight, a surface map, and a plurality of error terms for each level of mapping; and
    program instructions that cause a collection of VLC terms into a linear group of data.

12. The non-transitory computer-executable storage medium of claim 11, wherein the non-transitory computer-executable storage medium comprises program instructions that cause an iteration of processing error terms for additional surface mapping and for the reduction of bit encoding.

13. The non-transitory computer-executable storage medium of claim 11, wherein the non-transitory computer-executable storage medium comprises program instructions that cause a random access of the linear group of data from a buffer.

14. The non-transitory computer-executable storage medium of claim 11, wherein the non-transitory computer-executable storage medium comprises program instructions that cause fetching a first part of the linear group of data in a read operation and fetching a second part of the linear group of data if it is present.

15. The non-transitory computer-executable storage medium of claim 11, wherein the non-transitory computer-executable storage medium comprises program instructions that cause an indicator of whether the linear group of data is compressed.

\* \* \* \* \*